(12) United States Patent
Efrati

(10) Patent No.: US 8,879,476 B2
(45) Date of Patent: Nov. 4, 2014

(54) METHOD AND APPARATUS FOR PERFORMING NETWORK REGISTRATION

(71) Applicant: Vonage Network LLC, Holmdel, NJ (US)

(72) Inventor: Tzahi Efrati, Hoboken, NJ (US)

(73) Assignee: Vonage Network LLC, Holmdel, NJ (US)

( * ) Notice: Subject to any disclaimer, the term of this patent is extended or adjusted under 35 U.S.C. 154(b) by 0 days.

(21) Appl. No.: 13/784,279

(22) Filed: Mar. 4, 2013

(65) Prior Publication Data

US 2014/0247771 A1    Sep. 4, 2014

(51) Int. Cl.
*H04W 4/00* (2009.01)
*H04M 7/00* (2006.01)

(52) U.S. Cl.
CPC ................................. *H04M 7/0066* (2013.01)
USPC ........................................................ 370/328

(58) Field of Classification Search
USPC ........ 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
See application file for complete search history.

(56) References Cited

U.S. PATENT DOCUMENTS

| | | | |
|---|---|---|---|
| 5,742,905 A * | 4/1998 | Pepe et al. ..................... 455/461 |
| 6,073,015 A * | 6/2000 | Berggren et al. ........... 455/432.2 |
| 6,614,781 B1 * | 9/2003 | Elliott et al. ................... 370/352 |
| 6,856,598 B1 * | 2/2005 | Stanfield ....................... 370/235 |
| 7,440,445 B1 * | 10/2008 | Croak et al. .................... 370/352 |
| 7,788,354 B2 * | 8/2010 | Nag .............................. 709/223 |
| 8,315,275 B2 * | 11/2012 | Nag .............................. 370/468 |
| 8,401,552 B2 * | 3/2013 | Russell et al. ............. 455/435.1 |
| 8,422,986 B1 * | 4/2013 | Martin et al. .............. 455/404.1 |
| 2004/0120312 A1 | 6/2004 | Yeom |
| 2004/0172464 A1 * | 9/2004 | Nag .............................. 709/223 |
| 2006/0194591 A1 * | 8/2006 | Xiong et al. ................ 455/456.2 |
| 2006/0285492 A1 | 12/2006 | Lai et al. |
| 2007/0060097 A1 * | 3/2007 | Edge et al. ................. 455/404.1 |
| 2007/0127452 A1 | 6/2007 | Croy |
| 2007/0280213 A1 | 12/2007 | Sindhwani et al. |
| 2008/0031439 A1 * | 2/2008 | Synnestvedt et al. ..... 379/221.01 |
| 2010/0226364 A1 | 9/2010 | Pearce et al. |
| 2011/0096770 A1 * | 4/2011 | Henry ........................... 370/352 |
| 2012/0021736 A1 * | 1/2012 | Miyagawa et al. ......... 455/422.1 |
| 2012/0044908 A1 * | 2/2012 | Spinelli et al. ............... 370/331 |
| 2012/0057573 A1 * | 3/2012 | Piscopo ........................ 370/338 |
| 2012/0147806 A1 * | 6/2012 | Akhtar et al. ................. 370/312 |
| 2012/0252517 A1 * | 10/2012 | Karampatsis et al. ........ 455/515 |
| 2012/0252518 A1 * | 10/2012 | Karampatsis et al. ........ 455/515 |

OTHER PUBLICATIONS

PCT Search Report and Written Opinion, PCT/US2014/020282, mailed on May 30, 2014, 9 pages.

* cited by examiner

*Primary Examiner* — Jung-Jen Liu
(74) *Attorney, Agent, or Firm* — Moser Taboada; Joseph Pagnotta

(57) ABSTRACT

A method and apparatus for user location registration comprising registering subscriber location information associated with a device with a registration service in a first network, receiving, from a second network, a broadcast location request and sending, in response to the broadcast location request, the subscriber location information to the second network.

16 Claims, 5 Drawing Sheets

US 8,879,476 B2

METHOD AND APPARATUS FOR PERFORMING NETWORK REGISTRATION

BACKGROUND OF THE INVENTION

1. Field of the Invention

Embodiments of the present invention generally relate to a voice over internet protocol (VoIP) service, and more specifically, to a method and apparatus for performing network registration.

2. Description of the Related Art

VoIP networks generally rely on a session initiation protocol (SIP) registration method to identify the IP Address of devices on the network. These devices send SIP REGISTER messages, which function as indications about the device's connectivity, to SIP registration servers containing information about the location of the device. The SIP REGISTER method also serves as a means to indicate to the SIP registration server that the device is still currently active. However, in order to maintain knowledge of the device and location, SIP REGISTER messages must be sent at regular and frequent intervals from the device to the SIP registration servers. Pushing the SIP REGISTER message often imposes a burden on the device and consumes a significant amount of power, especially in the case of mobile devices such as cellular telephones or tablet computers. The SIP REGISTER messages may shorten the battery life of the device, interfere with network speed, or cause undesirable behavior in device functionality and software functionality.

Therefore, there is a need in the art for a method and apparatus for performing network registration from alternate sources other than a device executing a VoIP application.

SUMMARY OF THE INVENTION

Embodiments of the present invention relate to a method for user location registration comprising registering subscriber location information associated with a device with a registration service in a first network, receiving, from a second network, a broadcast location request and sending, in response to the broadcast location request, the subscriber location information to the second network.

Further embodiments of the present invention relate to an apparatus for device registration comprising a processor configured for executing instructions comprising the steps of registering subscriber location information associated with a device with a registration service in a first network, receiving, from a second network, a broadcast location request and sending, in response to the broadcast location request, the subscriber location information to the second network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to user or device network registration with a VoIP network. According to an exemplary embodiment, the user of a VoIP application executing on a device, for example a mobile device, is assigned location information by a network carrier. A translation service translates between subscriber information and location information, and sends this location information to external networks such as the VoIP network. When a call is initiated to the subscriber using the mobile device, the VoIP network broadcasts a request with a location query for that particular subscriber. The carrier network receives this request and responds to the VoIP network with the subscriber's location information, and the VoIP network establishes the call based on the given location information.

Figure 1:
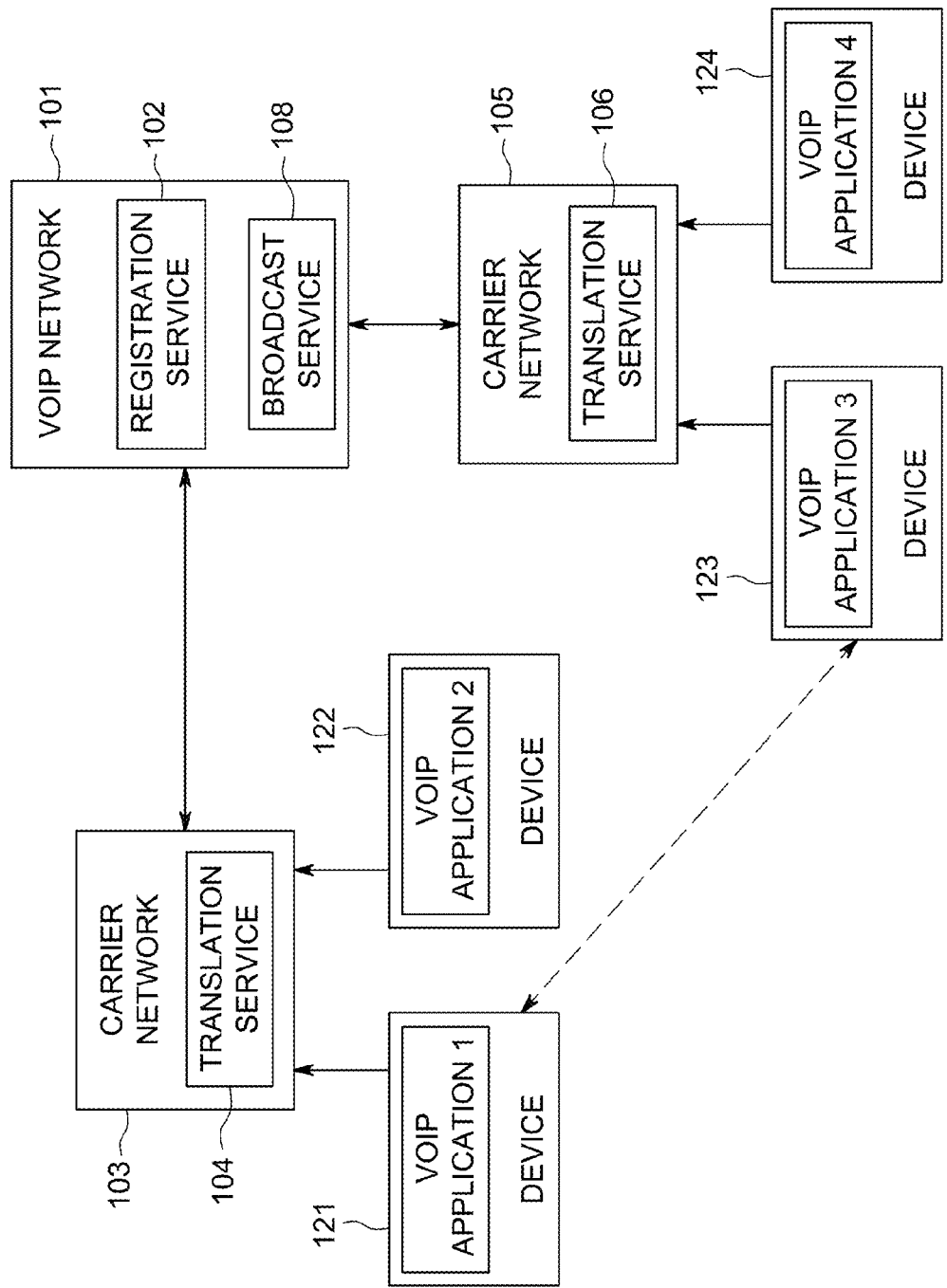
FIG. 1 is an illustration depicting a typical scenario in accordance with one or more embodiments of the present invention.

FIG. 1 is an illustration depicting a typical scenario in accordance with one or more embodiments of the present invention. The device 121 and the device 122 are hosted on the carrier network 103. The device 123 and the device 124 are hosted on the carrier network 105. Each device 121 to 124 has the VoIP application 1 . . . 4 loaded on it, where the VoIP applications 1 . . . 4 ("VoIP APP") are managed by the same service provider. Subscribers are able to communicate with other devices using the VoIP network 101 by using the VoIP APP. According to reference art, the device 121 would send SIP REGISTER messages containing location information to the registration server 102 of the VoIP network 101. The VoIP network 101 would then place an incoming call to the location information contained in the SIP REGISTER message, allowing the device 121 to receive the placed call.

According to this embodiment, the carrier network 103 sends the SIP REGISTER to the registration service 102. A VoIP subscriber using the device 121 logs into the VoIP APP to access the VoIP network 101. The carrier network 103 has already established location information for the device 121 through, for example, GSM/3G/4G/WIFI networks. According to some embodiments, the location information comprises an internet protocol version 4 (IPv4) address, an internet protocol version 6 (IPv6) address, or any identifying network address. Once the user has authenticated the VoIP APP with the VoIP network 101, the carrier network 103 associates the VoIP user credentials, for example, the user name, with the location information in its internal translation service 104. According to some other embodiments, the carrier network 103 may be an email service, a cellular service, a social networking service, a wireless access router, or the like. In the embodiment where the carrier network 103 is an email service, the email service stores the IP address of the device from which the subscriber is accessing the email service. The email service then hosts the translation service 104, returning location information to the VoIP network 101. Social networking services, wireless routers, and the like behave similarly.

In a typical scenario, the user of device 123 registered with carrier network 105 has associated its VoIP credentials using the translation service 106. The device 123 places a call to a particular user, (USER A) who happens to be logged into the VoIP APP on device 121. The VoIP network 101 receives the request to place the call to USER A, but does not know the location information of USER A. The VoIP network 101 further comprises a broadcast service 108 that makes a request to the translation service of several carriers, such as translation service 104 of carrier 103 and translation service 106 of carrier 105. The request comprises a query to determine whether USER A is on the carrier network receiving the request. The translation service 104 retrieves the list of associated users and location information, and determines that the list contains USER A. The translation service 104 returns the location information of USER A to the VoIP network 101. The network 101 subsequently establishes the call between the device 123 and device 121.

According to this embodiment, the VoIP APP executing on the device 121 no longer has to send SIP REGISTER messages to the VoIP network 101 because the location information is translated by the translation service 104. In some instances, a subscriber would like to become "unavailable" for incoming calls. According to one embodiment, the VoIP APP, or one of the intermediate service providers, explicitly signals the VoIP network 101 to indicate they are unavailable. In other instances, the carrier network 103 may store availability status information and convey that status to the VoIP network 101 on behalf of the subscriber.

In traditional SIP registration services, there is also a SIP deregistration process to de-register from the VoIP network 101. According to embodiments of the present invention, once the VoIP APP is closed, deregistration effectively occurs and the carrier network 103 deregisters, or removes, the user from the translation service 104 after a predetermined timeout expires. In some embodiments where the registration service 102 does not receive updates from the carrier network 103, timeout is set lower and is more accurate. If no service provider such as the carrier network 103 provides an update to the network 101, the user is assumed to have closed the device altogether, causing deregistration. Optionally, a user of a device may be queried to determine whether they would like to off-line, i.e., de-register, and closing the device, or VoIP application does not cause an automatic de-registration.

Figure 2:
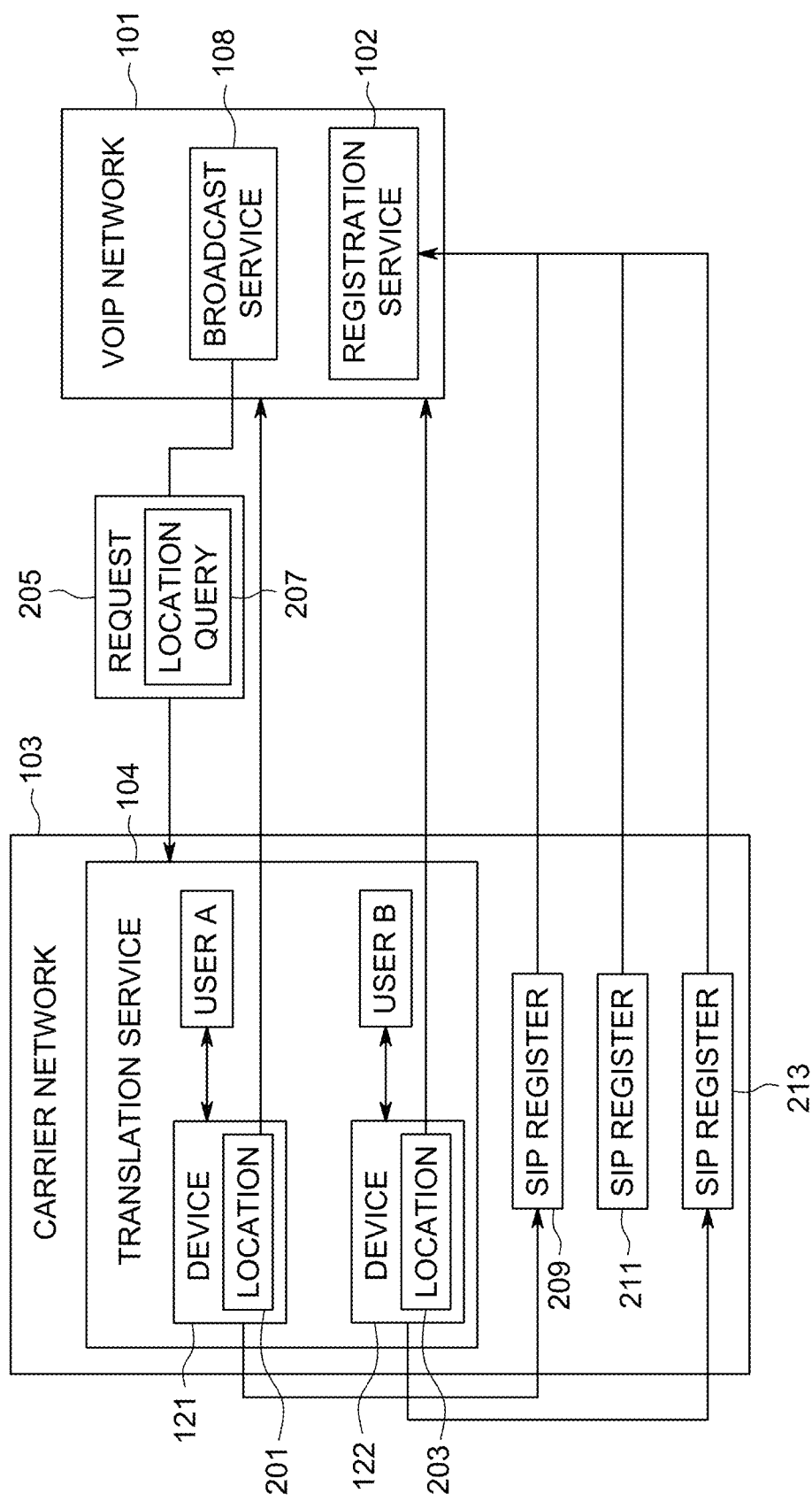
FIG. 2 is a more detailed depiction of the carrier network and the VoIP network in accordance with exemplary embodiments of the present invention.

FIG. 2 is a more detailed depiction of the carrier network 103 and the VoIP network 101 in accordance with exemplary embodiments of the present invention. The carrier network 103 comprises the translation service 104. The translation service 104 contains mappings between device 121 and USER A and device 122 and USER B. The device 121 further comprises location information 201, and the device 122 further comprises location information 203.

According to some embodiments, the device 121 is associated with a SIP REGISTER message 209 from the VoIP APP and the device 122 is associated with a SIP REGISTER message 213, where the SIP REGISTER message is stored for transmission by the carrier network 103 as opposed to by the VoIP APPs executing on the device 121 and the device 122. According to some embodiments, the broadcast service 108 broadcasts a request 205 comprising a location query 207. The carrier network 103 receives the request 205 and extracts user information from the request 205. The VoIP network 101 attempts to determine the location of the user specified in the user information.

The user information is compared to the mappings stored by the translation service 104, and a device location 201, or location 203 is sent to the VoIP network 101. The VoIP network 101 will know the location information for user A and will direct all calls to that location. According to some other embodiments of the present invention, the SIP REGISTER messages 209 and 213 are sent to the registration service 102 of the VoIP network 101 to confirm location information. In other embodiments, the translation service 104 sends only SIP REGISTER messages on behalf of VoIP capable devices using the carrier network 103.

Figure 3:
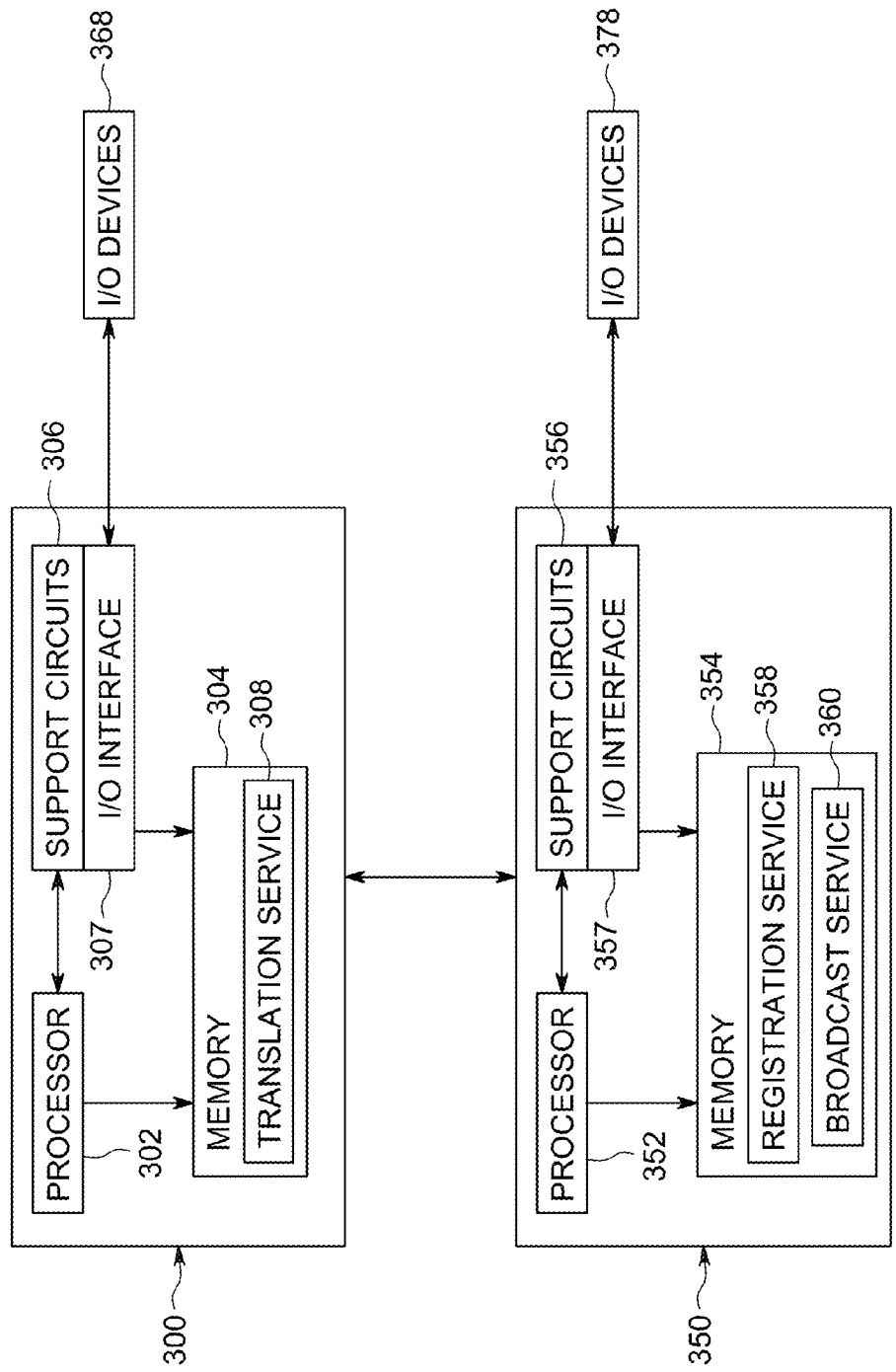
FIG. 3 depicts an implementation of the translation service of FIG. 1 by a first computer and the registration service and broadcast service by a second computer in accordance with at least one embodiment of the present invention.

FIG. 3 depicts an implementation of the translation service 104 of FIG. 1 by a computer 300 and the registration service 102 and broadcast service 108 by a computer 350 in accordance with at least one embodiment of the present invention. In some embodiments, the translation service 104, the registration service 102 and the broadcast service 108 may be implemented using a plurality of such computers, for example a group of servers. Additionally, in some embodiments, the registration service 102 and the broadcast service 108 may be implemented by two different computers. The computer 300 includes a processor 302, various support circuits 306, and memory 304. The processor 302 may include one or more microprocessors known in the art. The support circuits 306 for the processor 302 include conventional cache, power supplies, clock circuits, data registers, I/O interface 307, and the like. The I/O interface 307 may be directly coupled to the memory 304 or coupled through the support circuits 306. The I/O interface 307 may also be configured for communication with input devices and/or output devices 368 such as network devices, various storage devices, mouse, keyboard, display, video and audio sensors, IMU and the like.

The memory 304, or computer readable medium, stores non-transient processor-executable instructions and/or data that may be executed by and/or used by the processor 302. These processor-executable instructions may comprise firmware, software, and the like, or some combination thereof. Modules having processor-executable instructions that are stored in the memory 304 comprise a translation service 308. The computer 300 may be programmed with one or more operating systems, which may include OS/2, Java Virtual Machine, Linux, SOLARIS, UNIX, HPUX, AIX, WINDOWS, IOS, ANDROID among other known platforms.

The computer 350 includes a processor 352, various support circuits 356, and memory 354. The processor 352 may include one or more microprocessors known in the art. The support circuits 356 for the processor 352 include conventional cache, power supplies, clock circuits, data registers, I/O interface 357, and the like. The I/O interface 357 may be directly coupled to the memory 354 or coupled through the support circuits 356. The I/O interface 357 may also be configured for communication with input devices and/or output devices 378 such as network devices, various storage devices, mouse, keyboard, display, video and audio sensors, IMU and the like.

The memory 354, or computer readable medium, stores non-transient processor-executable instructions and/or data that may be executed by and/or used by the processor 352. These processor-executable instructions may comprise firmware, software, and the like, or some combination thereof. Modules having processor-executable instructions that are stored in the memory 304 comprise a registration service 358 and a broadcast service 360. The computer 300 may be programmed with one or more operating systems, which may include OS/2, Java Virtual Machine, Linux, SOLARIS, UNIX, HPUX, AIX, WINDOWS, IOS, ANDROID among other known platforms.

The memory 304 and the memory 354 may include one or more of the following random access memory, read only memory, magneto-resistive read/write memory, optical read/write memory, cache memory, magnetic read/write memory, and the like, as well as signal-bearing media as described below.

Figure 4:
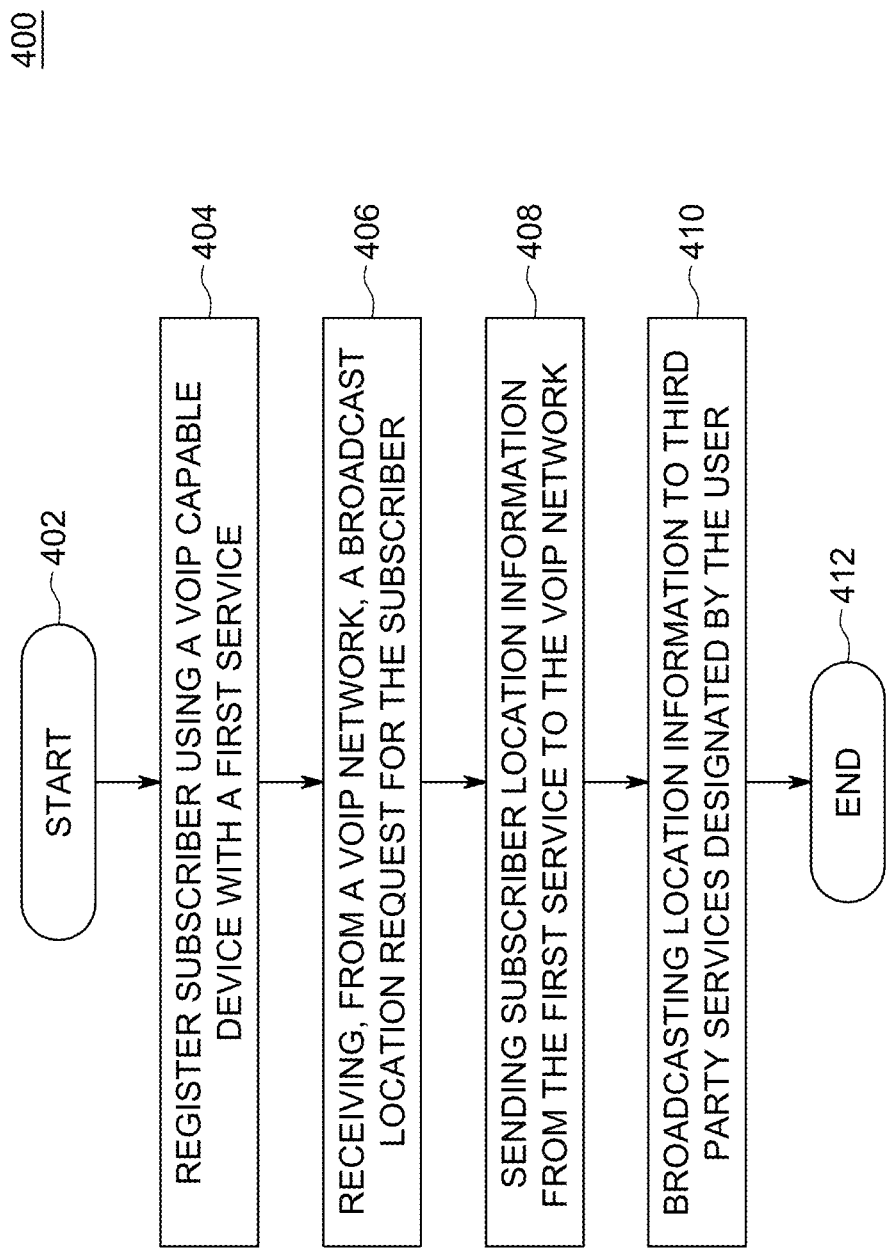
FIG. 4 depicts a flow diagram for a method for user location registration in accordance with previous embodiment of the present invention as depicted in FIGS. 1 and 2.

FIG. 4 depicts a flow diagram for a method 400 for user location registration in accordance with previous embodiment of the present invention as depicted in FIGS. 1 and 2. The method 400 is an exemplary implementation of the translation service 308 as executed on the computer system 300 shown in FIG. 3.

The method 400 begins at step 402 and proceeds to step 404. At step 404, the translation service registers a subscriber's device, such as a mobile device, with its network carrier. The translation service associates the subscriber information, for example, a VoIP network username or ID, with location information such as an IP address. The device may be computer software, mobile devices, VoIP devices or the like.

Once the subscriber device has been registered, the translation service may receive, from the VoIP network, a broadcast location request for the subscriber at step 406. According to other embodiments, the location information is sent to any external network, or external requesting party, authorized by either the subscriber, or the network carrier at step 408.

According to some embodiments, in addition to allowing the location information to be submitted to external networks, the device may also submit SIP REGISTER messages through the VoIP APP executing on the device at step 408.

At step 410, the first service broadcasts location information to third party services designated by the user. At this point, the user device and VoIP APP are capable of receiving calls based on the location information being broadcast to external networks. An external network attempting to reach the user consults with the translation service 308 to determine whether the user was registered by the translation service 308. If a call is placed to the user, the translation service 308 translates the user information to location information based on a stored association of user information and location information, and directs the call to the location specified in the location information, i.e., the user's device. The VoIP APP will receive the call and the user can engage in VoIP calls through the VoIP APP.

At step 410, the translation service may optionally broadcast the location information to third party services such as email services, FACEBOOK, APPLE VPNS Servers, wireless access points or cellular/mobile telecommunication towers. These services would then be able to know location information about a particular user without the device continuously submitting the location information to each of those services individually. The user may designate which particular services are privileged to know the location information from the translation service 308. The method terminates at step 412.

Figure 5:
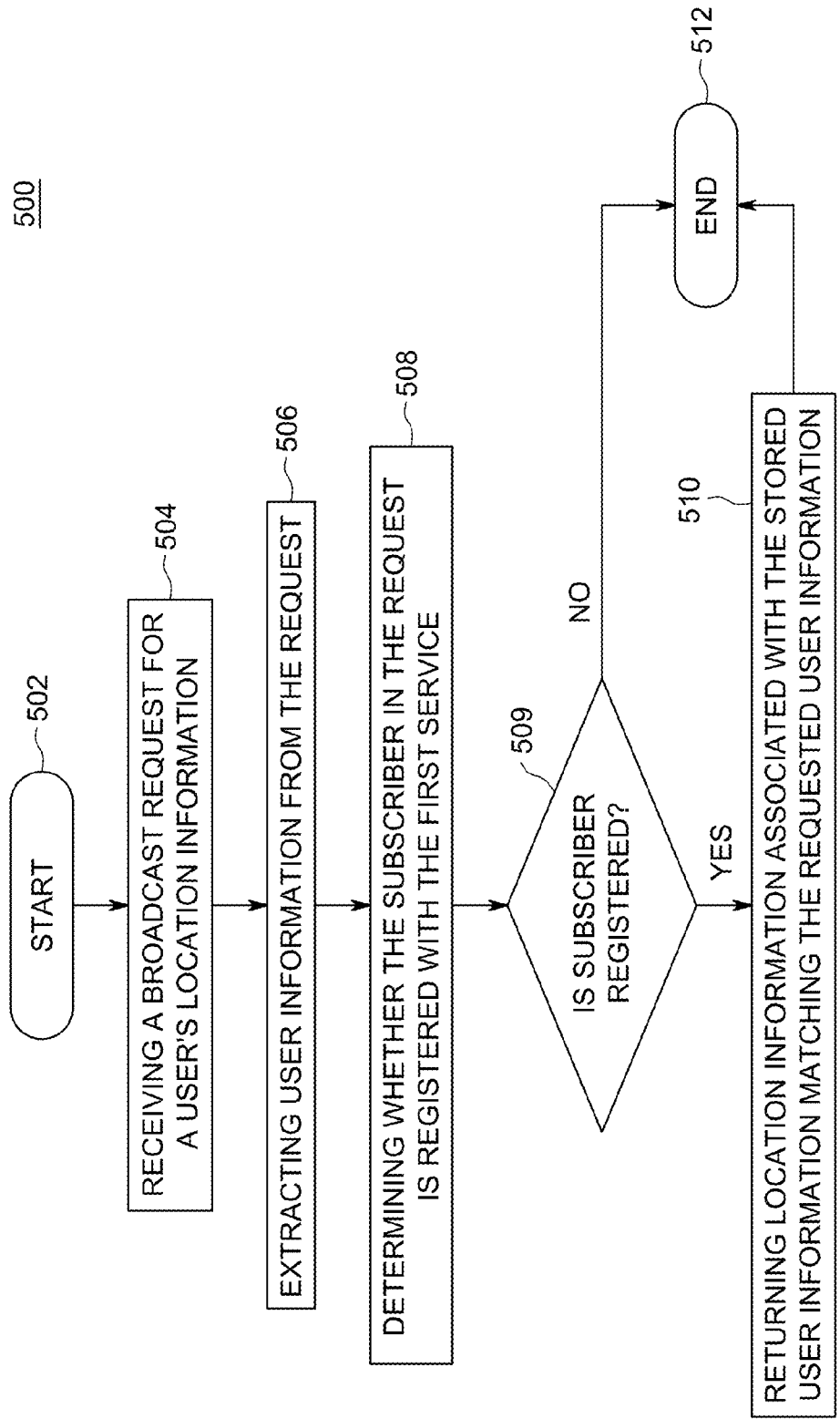
FIG. 5 depicts a flow diagram for another method for user location registration in accordance with previous embodiment of the present invention as depicted in FIGS. 1 and 2.

FIG. 5 depicts a flow diagram for a method 500 for user location registration in accordance with previous embodiment of the present invention as depicted in FIGS. 1 and 2. The method 500 is another exemplary implementation of the translation service 308 as executed on the computer system 300 shown in FIG. 3.

The method 500 begins at step 502 and proceeds to step 504. At step 504, the translation service 308 receives a broadcast request, such as request 205 (shown in FIG. 2), for a user's location information. The broadcast request contains a location query such as location query 207 as shown in FIG. 2. At step 506, the translation service 308 extracts the user information from the request. The user information contains information used in identifying the user to whom a call is being placed. The method 500 then proceeds to step 508, where the translation service 308 determines whether the subscriber in the request is registered with the translation service 308.

If the subscriber is determined to be not registered at step 509, the method terminates at step 512. If the subscriber is registered with the translation service 308 at step 509, the method moves to step 510. At step 510, the translation service 308 returns the location information associated with the stored user information which was matched with the user information found in the broadcast request. The method terminates at step 512.

While the foregoing is directed to embodiments of the present invention, other and further embodiments of the invention may be devised without departing from the basic scope thereof, and the scope thereof is determined by the claims that follow.

The invention claimed is:

1. A method for subscriber location determination comprising:
    determining, by a first network service provided by a first network, subscriber location information associated with a first user communication device registered with the first network, wherein the subscriber location information includes an Internet Protocol (IP) address of the first device, and wherein the IP address is not obtained via session initiation protocol (SIP) messaging received from the first device;
    receiving, by the first network service, a broadcast location request for the subscriber location information in response to a call initiated from a second user communication device wherein receiving the broadcast location request further includes determining subscriber identity information from the broadcast location request, and determining that the subscriber identity information is associated with the subscriber location information; and
    sending, by the first network service, the determined subscriber location information in response to the broadcast location request.

2. The method of claim 1 wherein the first network service is an email service.

3. The method of claim 1 wherein the first network service is a service available on a cellular network.

4. The method of claim 1 further comprising:
    broadcasting the subscriber location information to at least one third party service.

5. The method of claim 4 wherein the at least one third party service includes at least one of social networking services, email services and Wireless access points.

6. The method of claim 1 further comprising:
    receiving, by the first network service, a notification that the first device is unavailable to receive calls; and
    sending, by the first network service, an indication that the first device is unavailable to a network that sent the broadcast location request.

7. The method of claim 1, wherein the subscriber location information is sent to a Voice over Internet Protocol (VoIP) network after initial registration of the first device.

8. A system for device location determination comprising:
    a translation service disposed on a first network configured to:
        determine subscriber location information associated with a first user communication device registered with the first network, wherein the subscriber location information includes an Internet Protocol (IP) address of the first device, and wherein the IP address is not obtained via session initiation protocol (SIP) messaging received from the first device;

receive a broadcast location request for the subscriber location information in response to a call initiated from a second user communication device;

determine subscriber identity information from the broadcast location request;

determine that the subscriber identity information is associated with the subscriber location information; and send the determined subscriber location information in response to the broadcast location request.

9. The system of claim 8 wherein the first network service is an email service.

10. The system of claim 8 wherein the first network service is a service on a cellular network.

11. The system of claim 8 further comprising:
broadcasting the subscriber location information to at least one third party service.

12. The system of claim 11 wherein the at least one third party service includes at least one of social networking services, email services and Wireless access points.

13. The system of claim 8 wherein the translation service is further configured to:
receive a notification that the first device is unavailable to receive calls; and
send an indication that the first device is unavailable to a network that sent the broadcast location request.

14. The system of claim 8, wherein the subscriber location information is sent to a Voice over Internet Protocol (VoIP) network after initial registration of the first device.

15. A method for subscriber location determination comprising:
receiving, by a first service provider, a call request directed to a first device;
broadcasting a location request for subscriber location information of the first device to a second service provider; and
receiving, by the first service provider, subscriber location information in response to the broadcast location request and directly from the second service provider,
wherein the subscriber location information includes an Internet Protocol (IP) address of the first device, and wherein the IP address is not obtained from the first device via a session initiation protocol (SIP) message;
wherein the first service provider is a voice over internet protocol (VoIP) service provider.

16. The method of claim 15, wherein the second service provider is one of a cellular service provider, an email service provider, a social networking service provider, or a wireless access router.

* * * * *